US008560535B2

(12) United States Patent
Murthy

(10) Patent No.: US 8,560,535 B2
(45) Date of Patent: Oct. 15, 2013

(54) MECHANISMS FOR RANKING XML TAGS

(75) Inventor: Ravi Murthy, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 720 days.

(21) Appl. No.: 12/358,610

(22) Filed: Jan. 23, 2009

(65) Prior Publication Data

US 2010/0191745 A1    Jul. 29, 2010

(51) Int. Cl.
*G06F 7/04* (2006.01)
(52) U.S. Cl.
USPC .......................................................... 707/730
(58) Field of Classification Search
None
See application file for complete search history.

(56) References Cited

U.S. PATENT DOCUMENTS

| | | | | |
|---|---|---|---|---|
| 6,601,071 B1* | 7/2003 | Bowker et al. | | 715/234 |
| 7,003,511 B1* | 2/2006 | Antonov | | 707/730 |
| 7,127,469 B2* | 10/2006 | Lindblad et al. | | 1/1 |
| 7,346,604 B1* | 3/2008 | Bharat et al. | | 1/1 |
| 7,512,932 B2* | 3/2009 | Davidov et al. | | 717/106 |
| 7,685,198 B2* | 3/2010 | Xu et al. | | 707/748 |
| 7,685,200 B2* | 3/2010 | Gunawardena et al. | | 707/748 |
| 7,899,816 B2* | 3/2011 | Kolo et al. | | 707/729 |
| 7,917,519 B2* | 3/2011 | Kimbrough et al. | | 707/749 |
| 8,290,961 B2* | 10/2012 | Chew et al. | | 707/748 |
| 8,396,878 B2* | 3/2013 | Acharya | | 707/749 |
| 2002/0116371 A1 | 8/2002 | Dodds et al. | | |
| 2003/0014397 A1 | 1/2003 | Chau et al. | | |
| 2004/0004640 A1* | 1/2004 | Iida | | 345/810 |
| 2004/0083209 A1 | 4/2004 | Shin | | |
| 2004/0243555 A1 | 12/2004 | Bolsius et al. | | |
| 2006/0106746 A1* | 5/2006 | Stuhec | | 707/1 |
| 2006/0117033 A1 | 6/2006 | Apparao et al. | | |
| 2007/0016605 A1* | 1/2007 | Murthy et al. | | 707/102 |
| 2007/0162448 A1* | 7/2007 | Jain et al. | | 707/7 |
| 2007/0174247 A1* | 7/2007 | Xu et al. | | 707/3 |
| 2008/0215583 A1* | 9/2008 | Gunawardena et al. | | 707/7 |
| 2009/0077025 A1* | 3/2009 | Brooks et al. | | 707/3 |
| 2009/0112859 A1* | 4/2009 | Dehlinger | | 707/6 |
| 2009/0240712 A1* | 9/2009 | Murthy | | 707/100 |
| 2009/0307666 A1* | 12/2009 | Kilian et al. | | 717/125 |
| 2012/0278337 A1* | 11/2012 | Acharya | | 707/748 |
| 2013/0060784 A1* | 3/2013 | Acharya et al. | | 707/748 |

OTHER PUBLICATIONS

Dalamagas et al., "Clustering XML Documents Using Structural Summaries", Springer Berlin/ Heidelberg, vol. 3268/ 2005, 10 pages.

* cited by examiner

*Primary Examiner* — Hung Q Pham
*Assistant Examiner* — Hubert Cheung
(74) *Attorney, Agent, or Firm* — Hickman Palermo Truong Becker Bingham Wong LLP

(57) ABSTRACT

XML Schema design often involves repeating work already done by others. Schema designers benefit from a system that helps designers choose from a set of candidate XML tags already in use by others. Mechanisms are described for providing decision support in the selection of candidate XML tags based on tags that are in use within a collection of XML documents. The approaches presented include a static analysis of tags which reflects the use of such tags in documents considered to be of high quality. A real-time analysis of tags considers the shared context of candidate XML tags with the set of tags already selected for use in the schema under design. Measure values resulting from the static analysis and/or the real-time analysis are used to derive an overall ranking measure for each candidate tag, and the candidate tags may be displayed in rank order of their measure values.

22 Claims, 3 Drawing Sheets

MECHANISMS FOR RANKING XML TAGS

RELATED CASES

The present application is related to the following U.S. Applications:

U.S. application Ser. No. 11/184,302, "A Mechanism For Computing Structural Summaries Of XML Document Collections In A Database System, filed on Jul. 18, 2005, which is incorporated herein by reference;

FIELD OF THE INVENTION

The techniques presented herein are directed towards decision support for XML schema design.

BACKGROUND OF THE INVENTION

XML Documents

Large collections of XML (eXtensible Markup Language) documents are increasingly prevalent in the enterprise. Information about the structure of specific types of XML documents may be specified in documents referred to as "XML schemas". For example, the XML schema for a particular type of XML document may specify the names for the data items (tags) contained in, or found within, that particular type of XML document, the hierarchical relationship between the data items contained in that type of XML document, data types of the data items contained in that particular type of XML document, etc.

Node Tree Model

An important standard for XML is the XQuery 1.0 and XPath 2.0 Data Model. (see W3C Working Draft 9 Jul. 2004, which is incorporated herein by reference) One aspect of this model is that a XML document is represented by a tree hierarchy of nodes that reflects the hierarchical nature of the XML document. A tree hierarchy of nodes is composed of nodes at multiple levels. Nodes at the same level are sibling nodes. In a tree hierarchy or node tree, each child node has only one parent node that resides at a higher level than the child node, but a parent node may have multiple child nodes residing at a lower level than the parent node. In a tree hierarchy, the root node is one that has no parent node, and a leaf node has no child nodes. A tree hierarchy has a single root node.

In a node tree that represents a XML document, a node can correspond to an element. The child nodes of the node correspond to an attribute or another element contained in the element. The node may be associated with a name. For example, the name of the node representing the element book is book. For a node representing the attribute publisher, the name of the node is publisher.

For convenience of expression, elements and other parts of a XML document are referred to as nodes within a tree of nodes that represents the document. Thus, a node representing an element may be referred to by the element name, and a node value may be referred to as the element value. For example, referring to 'My book' as the value of the node with the name book is just a convenient way of expressing that the value of the element associated with node book is My book. The name of an element, attribute, or node is also referred to herein as a tag name.

XML TAGS

XML elements are delimited by a start tag and a corresponding end tag. For example, in the following XML fragment, <Author> is a start tag and </Author> is an end tag to delimit an element.

```
<book>My book
    <publication publisher="Doubleday"
        date="January"></publication>
    <Author>Mark Berry</Author>
    <Author>Jane Murray</Author>
</book>
```

The data between the element start and end tags is referred to as the element's content. An element's content may include values and other elements. In the case of the Author element, the content of the element is the text data value Mark Berry. In the case of the Book element, the content includes the value My Book and the elements publication and two Author elements. An element and the tags that delimit the element are herein referred to by the element name. For example, the element delimited by the start and end tags <publication> and </publication> is referred to as publication, and the tag name is publication as well.

Name Spaces

XML namespaces allow for uniquely naming elements and attributes in an XML document. XML namespaces are defined by a W3C recommendation called Namespaces in XML. An XML document may contain element or attribute names from more than one XML vocabulary. If each vocabulary is given a namespace then the ambiguity between identically named elements or attributes can be resolved. A simple example is an XML document that contains references to a customer and an ordered product, and both the customer element and the product element have a child element "ID_number". References to the element ID_number are ambiguous unless the two identically named but semantically different elements are brought under namespaces to differentiate the elements.

Challenges of Schema Design

One reason for the increasing popularity of XML is that the tag names, being comprised of text, can be used descriptively and are therefore used to convey the semantic of an element and attribute. For example, the element <address> is used to store data representing an address.

However, the tag names are often created by independent individuals or groups implementing a specific application or project. Hence, the same semantic may end up being represented by different tag names within different XML documents. Though there are some XML vocabularies emerging from standard committees or industry consortia, these still account for a very small fraction of the overall XML tag names being used. There is an ongoing proliferation of tag names, and many different tag names are being created, in adhoc fashion, to mean a similar or same semantic. This problem arises across groups within the same company and different companies.

For example, an address value may be represented by the element <Address> within one XML document, but may be represented by a different element <Addr> in another document. Further, these tags may be using different namespaces.

For example, company C1 could be using <c1: Address> whereas company C2 uses <c2:Address>. From a XML point of view, these tags and the elements defined by these tags are different and are assumed to mean different things.

A set of tag names, that are different from each other, but that may be treated as being semantically identical, are referred to herein as semantically equivalent heterogeneous tag names or simply semantically equivalent [tag] names. In the above example, <Address>, <Addr>, <c1:Address>, and <c2:Address> have semantically equivalent heterogeneous tag names.

When designing a new type of document, the XML schema design process may include sharing tags from other XML schemas defined by various standards bodies and/or various users and groups within the same enterprise. As an example, an IT professional working in a law school data center might design a new XML schema where a person's name must be represented. The Common Information Model (CIM) standard (that is sometimes used within the IT community) defines CIM_Usercontact/Name and a CIM_OtherPersonInformation/Name. JXDM (a standard for the legal community) defines PersonFullName, and SIF (an educational standard) defines ContactInfo/Name/FullName. The schema designer must decide which of these or other similar definitions for a person's name should be used in the new schema, or whether yet another definition is needed that is specific to the new context.

Approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Overview

XML Schema designers often model objects that already have been modeled in an XML schema that was defined in another context, for another use, and/or used in a different organization. Also, many objects comprise an aggregation of components that have already been modeled in a schema. An example might be a postal address. Many XML schemas include a postal address, and many XML schemas have already been defined for such an object. Designing a new XML schema requiring a postal address is more efficient with support for reusing the schema constructs already in existence. Even if none of the already-defined postal address definitions fit the current schema need, there is a high probability that one or more of the individual components (elements) of an existing postal address structure could be re-used.

A schema designer partially completes designing a new schema. The partially completed schema comprises a set of selected XML tags. In order to complete the design, the designer needs to choose additional tags, and the designer needs help to select the best additional tags for the schema under design. First, a set of potential, fully-qualified tag names (includes the namespace prefix) are selected by means outside the scope of this invention. The techniques described herein enable schema designers to evaluate the suitability of each of the tags in the candidate set for their new schema based on an existing collection (corpus) of XML documents. It uses the latent information in the usage of tags within the existing collection of XML documents and turns it into a quantitative measure value. The approach evaluates each candidate tag with respect to each document in the collection by measuring various attributes of each document relative to the tag and assigning a measure value. The tags already selected for inclusion in the schema form a context in which additional tags may be evaluated for suitability.

The overall measure for each candidate tag may consider one or more of the individual document measures. The overall measure is called a ranking measure because the overall ranking measure is the value used to rank the various candidate tags against each other, enabling the user to select the best for the desired purpose. The word score may be used interchangeably with measure value, or measure to emphasize the evaluative and comparison function of the measures.

Figure 1:
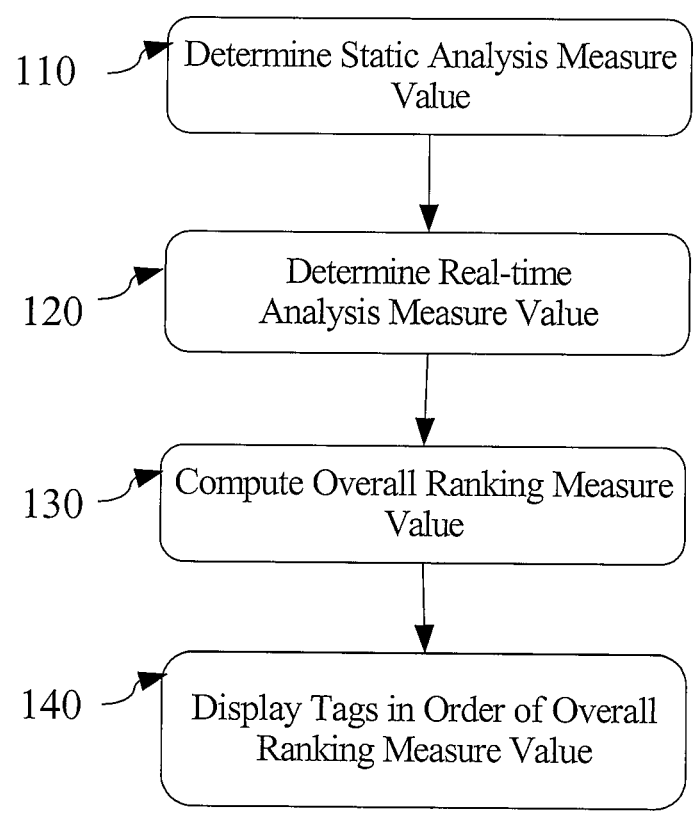
FIG. 1 is a flow diagram showing an overview of the steps for presenting the user with a list of tags in order of their overall ranking measure.

FIG. 1 shows a flow diagram of steps for one embodiment of measuring a set of candidate tags for selection by a schema designer. Other embodiments do not include all the steps shown in FIG. 1. One aspect of the approach is to determine the extent to which a particular candidate tag is used by others. A static analysis process evaluates one or more XML documents in a collection of documents to determine how frequently the particular candidate tag appears in each document, and optionally to determine how useful the XML document is to a community of users. Static analysis may be an offline process, and can be done independently of any particular schema design process, because static analysis considers the content and use of a static collection of documents and need not consider the subject matter of the new schema under design.

"Real-time analysis" is the process that complements static analysis by taking into consideration the context specific to the particular schema being designed (Step 120). The term "real-time" is meant to indicate that the process may be run at the time that design is taking place and may involve online user interaction.

The overall static analysis and the real-time analysis measure values may be combined into a single ranking measure value (Step 130) that can be used to rank the tags in order of their measure value for display to the designer (Step 140).

Static Analysis

As mentioned in the overview, static analysis may be performed over a collection of XML documents independent of a request to find interesting tags. The set of documents in the collection and their contents is expected to change infrequently, so the static analysis measure value for each XML tag found in the collection of documents can be pre-computed, saved, and then used when a request is issued. When there is a change in the set of documents or in the content of a document, the static analysis scoring process may be re-run. For example, when a new document joins the document set, the offline process can be re-run to determine the (possibly new) static analysis measure values for the XML tags within the new document.

Figure 2:
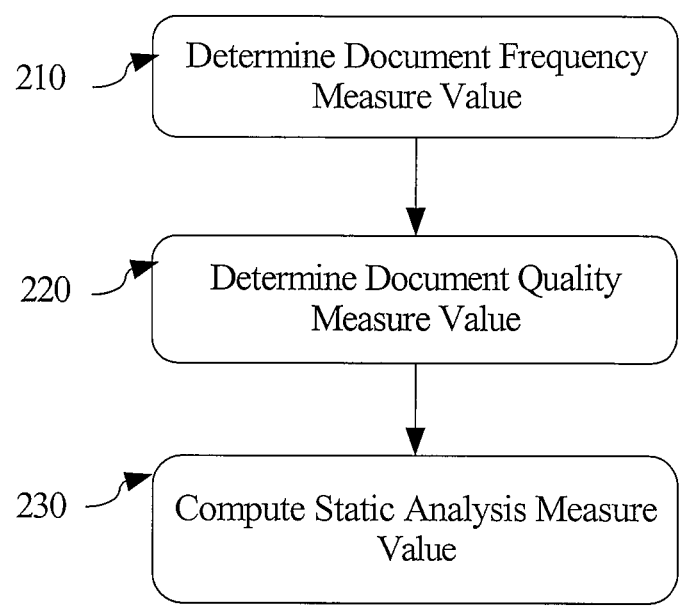
FIG. 2 is a flow diagram showing the steps for one embodiment of calculating a document static analysis measure for an XML tag.

There may be at least two aspects to static analysis. FIG. 2 shows the steps for one embodiment of calculating an overall static analysis measure value for an XML tag. First, a document frequency measure value is determined by counting the number of occurrences of the candidate tag in each document (Step 210). In one embodiment, the tag frequencies for each document can be added together, and the sum can be used by itself for ranking candidate tags for the designer:

$$\text{tag frequency measure value}(candidatetag) = \sum_{j=1}^{n} f(candidatetag, d_j)$$

where there are n documents in the collection, and the number of occurrences (frequency) of the candidate tag found in the $j^{th}$ document ($d_j$) are added together.

Another embodiment for computing the tag frequency is to bias each occurrence of a tag found in a document by its distance from the root. The closer a tag is to the document root, the more important the tag may be. Thus, rather than giving all tag occurrences the same count of 1, different weighted counts may be used based on the hierarchical position of the tag in the document.

However, the static analysis measure value may be more meaningful if the occurrence-based measure value (also referred to as a popularity or frequency measure value) for each document is weighted by an indication of the quality of the document, and the enhanced measure values are added together. Therefore, an optional step to enhance the accuracy of the static analysis measure value is to determine a document quality measure value for each document containing the candidate tag in the collection of documents (Step 220). Many ways exist to measure the quality of a document. One example of a document quality measurement is to perform link analysis (also referred to as PageRank in certain literature). Link analysis counts the number of times other documents refer to the document being measured. The most useful documents are expected to have the most inbound references from other documents. Thus, documents with more inbound links generally have higher quality measure values. The full details for computing document quality measures are outside the scope of this invention. Further, any of the prior techniques for computing document quality may be used in conjunction with the techniques described herein. Tags found in documents with higher quality measure values may be assigned values that are higher than tags found in lower quality documents.

Another embodiment for weighting documents is to consider the relevance of the document to the schema designer. For example, a document might be considered of high quality if the document is in use by the same community of interest as the designer. For example, a document in use within the same company or organization, or related to the subject matter of the new schema under design, might be considered of higher quality.

The final step is to combine the frequency measure value for each document/tag combination with the document quality measure value to create the final static analysis measure value (Step 230). A formula for calculating the static analysis measure value for a candidate tag may be:

$$\text{static analysis measure value}(candidatetag) = \sum_{j=1}^{n} f(candidatetag, d_j) * w(d_j)$$

where n is the number of documents in the collection of documents, and $w(d_j)$ is the weight of the $j^{th}$ document, also called the "document quality measure value," given to $d_j$.

Selecting Tag Candidates

There are several different ways that designers might find tag candidates to measure value in order to select the tag that is best for the intended use. The designers could perform a keyword search on a set of XML documents using a technique such as is described in U.S. patent application Ser. No. 12/360,919, "Mechanisms For Efficient Autocompletion In XML Search Applications," to find tags with the same name within different namespaces. The technique therein provides tag auto-completion for users looking for a particular tag in an XML document. The technique completes the end of the tag name (suffix) given a prefix specified by the user. A similar but different technique could provide a prefix auto-completion technique that could interpret the user input as the suffix for tags in the XML documents and auto-complete the name space prefix. For example, if the user typed "name," the prefix auto-completion engine could produce a list of all of the tag names that end in name which might only differ by the namespace prefix (e.g. ebxml:name, hr:name, acme:name, foo:name).

Alternatively, the designers might browse through the list of tag frequencies stored during the static analysis phase. There might already be several similar tags in use, and the designers might have to choose the best one. The process of scoring the candidate tags is independent of how the designer arrives at selecting the set of XML tags to rank.

Real-Time Analysis for a Tag Candidate

The real-time analysis can be performed on a set of tag candidates based on the kind of XML schema being designed. The kind of schema being designed may be characterized by the set of XML tags that have already been selected for use in the schema. The real-time analysis measure value reflects the extent to which each candidate tag is used in a context similar to the set of tags that have already been selected for the schema being designed.

To determine the real-time analysis measure value for a particular candidate tag, a shared context measure value may be determined for each document. The shared context measure value is a measure of how many of the other tags in the new schema are co-located in the document with the particular tag. A candidate tag and an already-selected tag are co-located in a document if there is at least one instance of each found within that same document. Thus, in one embodiment, the shared context measure value may be simply the number of distinct, previously-selected XML tags that are co-located in the document with the candidate tag. Thus, if there were 5 different tags already selected for the schema, and a document containing the candidate tag contained 3 of the 5 selected tags, then the measure value for that document would be 3. Thus, one formula for the real-time analysis weight of a document may be:

$$\text{real-time analysis measure value for } d_j = \sum_{k=1}^{m} p_j(t_k)$$

where m represents the number of already selected tags, and $p_j(t_k)$ is a function representing the presence or absence of a previously selected tag which returns the value 1 when the previously selected tag is contained in document $d_j$ and returns 0 if $t_k$ is not contained in document $d_j$.

In one embodiment, the frequency of occurrence of any one tag type need not matter. Thus, if an already selected tag appears 20 times in the same document with a particular candidate tag, the already-selected tag may still only contribute 1 to the document real-time analysis measure value for the tag. In an alternative embodiment, the number of instances of each distinct previously selected tag may also be considered.

Computing Overall Ranking Measure for a Candidate Tag

An overall ranking measure may be determined for a candidate tag based on one or more factors. The ranking measure is used to compare one candidate tag against another and sort the candidate tags in rank order. In one embodiment, the overall ranking measure for a candidate tag may be based on a static analysis measure value and the real-time analysis measure value for the candidate tag with respect to each document in the set of documents. The real-time analysis measure value may serve as an additional weighting factor to the static analysis measure value that may or may not include a document quality measure value. To obtain an overall ranking measure for a candidate tag, the measure values for each of the documents for the candidate tag may be added together. Thus, for an embodiment where all measure values are used together, the formula for the overall ranking measure may be:

$$\text{overall candidate ranking measure} = \sum_{j=1}^{n} f(candidatetag, d_j) * w(d_j) * \left( \sum_{k=1}^{m} p_j(t_k) \right)$$

which is the sum of each of the document measure values of the set of n documents where each document measure value comprises multiplying three factors: the document frequency measure value, the document quality measure value, and the real-time analysis measure value.

Hardware Overview

Figure 3:
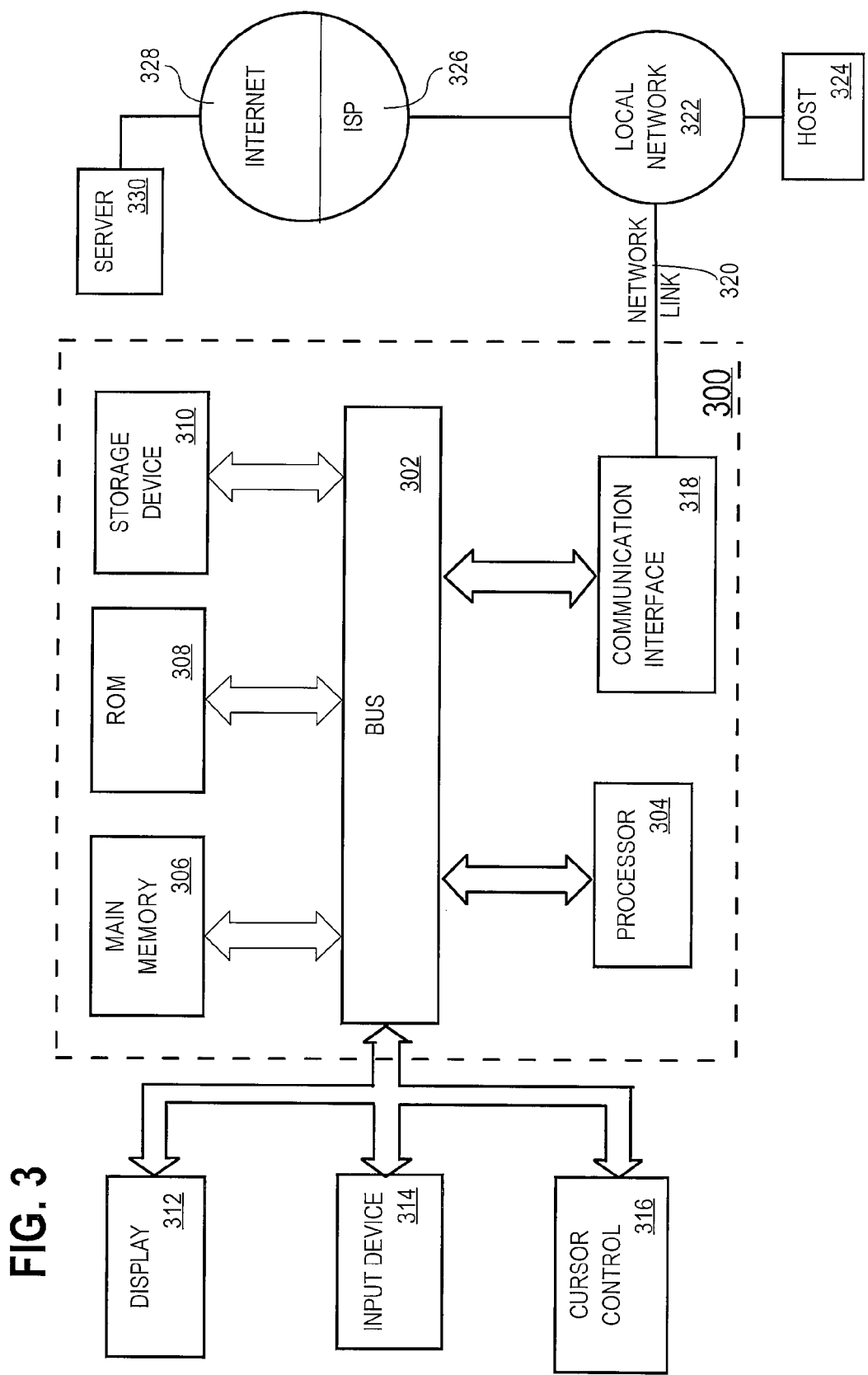
FIG. 3 is a block diagram of a computer system that may be used in an embodiment of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A computer-implemented method, comprising:
    establishing a set of user selected eXtensible Markup Language (XML) tags and a set of candidate XML tags; and
    for a candidate XML tag in said set of candidate XML tags:
        determining, based on a collection of XML documents, a ranking measure for said candidate XML tag, said ranking measure reflecting a rank of said candidate XML tag relative to other candidate XML tags of said set of candidate XML tags;
        wherein said ranking measure for said candidate XML tag in said set of candidate XML tags is determined based on a real-time analysis measure value that is determined based on co-locations of said candidate XML tag and one or more user selected XML tags of said set of user selected XML tags in one or more XML documents of said collection of XML documents; and
        storing first data that, for said candidate XML tag in said set of candidate XML tags, associates said candidate XML tag with said ranking measure.

2. The computer-implemented method of claim 1, wherein said ranking measure for said candidate XML tag in said set of candidate XML tags is further determined based on a static analysis measure value that is determined based on a number of occurrences of said candidate XML tag found within said one or more XML documents of said collection of XML documents.

3. The computer-implemented method of claim 2, wherein said ranking measure for said candidate XML tag is determined based on said real-time analysis measure value;
    wherein said real-time analysis measure value for said candidate XML tag is determined based on context measure values of said one or more XML documents in said collection of XML documents, wherein a particular context measure value for a particular XML document in said collection of XML documents is determined based on a number of XML tags of said set of user selected XML tags found within said particular XML document.

4. The computer-implemented method of claim 2, wherein said ranking measure for said candidate XML tag is determined based on multiplying said static analysis measure value times said real-time analysis measure value.

5. The computer-implemented method of claim 2, wherein determining said static analysis measure value is based on a document quality measure value for each of said one or more XML documents of said collection of XML documents, wherein said document quality measure value indicates a usefulness of said each of said one or more XML documents to a community of users.

6. The computer-implemented method of claim 5, wherein said determining said static analysis measure value is further based on a document frequency measure value for each of said one or more XML documents of said collection of XML documents, wherein determining said document frequency measure value is based on a frequency of occurrence of said candidate XML tag found within said each of said one or more XML documents.

7. The computer-implemented method of claim 5, wherein said document quality measure value is determined based on performing link analysis.

8. The computer-implemented method of claim 5, wherein said document quality measure value is determined based on a community that uses said each of said one or more XML documents.

9. The computer-implemented method of claim 5, wherein said ranking measure for said candidate XML tag is determined by adding together respective document static analysis measure values for said each of said one or more XML documents of said collection of XML documents, wherein a particular document static analysis measure value for a particular XML document of said one or more XML documents is determined based on a particular document quality measure value and a particular document frequency measure value of said particular XML document.

10. The computer-implemented method of claim 6, wherein said determining said document frequency measure value of said candidate XML tag found within said each of said one or more XML documents is further based on a number of hierarchical levels from a root where said candidate XML tag is found within said each of said one or more XML documents.

11. A computer-implemented method comprising:
establishing a set of user selected eXtensible Markup Language (XML) tags and a set of candidate XML tags; and
for a candidate XML tag in said set of candidate XML tags,
determining a ranking measure for said candidate XML tag, said ranking measure reflecting a rank of said candidate XML tag relative to other candidate XML tags of said set of candidate XML tags;
wherein said ranking measure is determined based on a set of measure values for each XML document in a collection of XML documents;
said set of measure values for said each XML document including a static analysis measure value and a real-time analysis measure value;
determining said static analysis measure value based on a document frequency measure value and a document quality measure value;
determining said real-time analysis measure value based on co-locations of said candidate XML tag and one or more user selected XML tags of said set of user selected XML tags in one or more particular XML documents of said collection of XML documents; and
storing first data that, for said candidate XML tag in said set of candidate XML tags, associates said candidate XML tag with said ranking measure.

12. A non-transitory computer-readable storage medium storing instructions, wherein said instructions, when executed by one or more processors, cause:
establishing a set of user selected eXtensible Markup Language (XML) tags and a set of candidate XML tags; and
for a candidate XML tag in said set of candidate XML tags:
determining, based on a collection of XML documents, a ranking measure for said candidate XML tag, said ranking measure reflecting a rank of said candidate XML tag relative to other candidate XML tags of said set of candidate XML tags;
wherein said ranking measure for said candidate XML tag in said set of candidate XML tags is determined based on a real-time analysis measure value that is determined based on co-locations of said candidate XML tag and one or more user selected XLM tags of said set of user selected XML tags in one or more XML documents of said collection of XML documents; and
storing first data that, for said candidate XML tag in said set of candidate XML tags, associates said candidate XML tag with said ranking measure.

13. The non-transitory computer-readable storage medium of claim 12, wherein said ranking measure for said candidate XML tag in said set of candidate XML tags is further determined based on a static analysis measure value that is determined based on a number of occurrences of said candidate XML tag found within said one or more XML documents of said collection of XML documents.

14. The non-transitory computer-readable storage medium of claim 13, wherein said ranking measure for said candidate XML tag is determined based on said real-time analysis measure value;
wherein said real-time analysis measure value for said candidate XML tag is determined based on context measure values of said one or more XML documents in said collection of XML documents, wherein a particular context measure value for a particular XML document in said collection of XML documents is determined based on a number of XML tags of said set of user selected XML tags found within said particular XML document.

15. The non-transitory computer-readable storage medium of claim 13, wherein said ranking measure for said candidate XML tag is determined based on multiplying said static analysis measure value times said real-time analysis measure value.

16. The non-transitory computer-readable storage medium of claim 13, wherein determining said static analysis measure value is based on a document quality measure value for each of said one or more XML documents in said collection of XML documents, wherein said document quality measure value indicates a usefulness of said each of said one or more XML documents to a community of users.

17. The non-transitory computer-readable storage medium of claim 16, wherein said determining said static analysis measure value is further based on a document frequency measure value for each of said one or more XML documents in said collection of XML documents, wherein determining said document frequency measure value is based on a frequency of occurrence of said candidate XML tag found within said each of said one or more XML documents.

18. The non-transitory computer-readable storage medium of claim 16, wherein said document quality measure value is determined based on performing link analysis.

19. The non-transitory computer-readable storage medium of claim 16, wherein said document quality measure value is determined based on a community that uses said each of said one or more XML documents.

20. The non-transitory computer-readable storage medium of claim 16, wherein said ranking measure for said candidate XML tag is determined by adding together respective document static analysis measure values for said each of said one or more XML documents of said collection of XML documents, wherein a particular document static analysis measure value for a particular XML document of said one or more XML documents is determined based on a particular document quality measure value and a particular document frequency measure value of said particular XML document.

21. The non-transitory computer-readable storage medium of claim 17, wherein said determining said document frequency measure value of said candidate XML tag found within said each of said one or more XML documents is further based on a number of hierarchical levels from a root where said candidate XML tag is found within said each of said one or more XML documents.

22. A non-transitory computer-readable storage medium storing instructions, wherein said instructions, when executed by one or more processors, cause:
establishing a set of user selected eXtensible Markup Language (XML) tags and a set of candidate XML tags; and
for a candidate XML tag in said set of candidate XML tags
determining a ranking measure for said candidate XML tag, said ranking measure reflecting a rank of said candidate XML tag relative to other candidate XML tags of said set of candidate XML tags;
wherein said ranking measure is determined based on a set of measure values for each XML document in a collection of XML documents;
said set of measure values for said each XML document including a static analysis measure value and a real-time analysis measure value;
determining said static analysis measure value based on a document frequency measure value and a document quality measure value;

determining said real-time analysis measure value based on co-locations of said candidate XML tag and one or more user selected XML tags of said set of user selected XML tags in one or more particular XML documents of said collection of XML documents; and storing first data that, for said candidate XML tag in said set of candidate XML tags, associates said candidate XML tag with said ranking measure.

* * * * *

UNITED STATES PATENT AND TRADEMARK OFFICE
CERTIFICATE OF CORRECTION

| | |
|---|---|
| PATENT NO. | : 8,560,535 B2 |
| APPLICATION NO. | : 12/358610 |
| DATED | : October 15, 2013 |
| INVENTOR(S) | : Murthy |

It is certified that error appears in the above-identified patent and that said Letters Patent is hereby corrected as shown below:

In the Claims

Column 11, line 46, in Claim 12, delete "XLM" and insert -- XML --, therefor.

Signed and Sealed this
Third Day of June, 2014

Michelle K. Lee
*Deputy Director of the United States Patent and Trademark Office*